US012672063B2

(12) United States Patent
Belling

(10) Patent No.: US 12,672,063 B2
(45) Date of Patent: Jun. 30, 2026

(54) TRIGGERING MBS INACTIVE RECEPTION MODE ANNOUNCEMENT

(71) Applicant: Nokia Solutions and Networks Oy, Espoo (FI)

(72) Inventor: Horst Thomas Belling, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 598 days.

(21) Appl. No.: 18/313,176

(22) Filed: May 5, 2023

(65) Prior Publication Data

US 2024/0373347 A1     Nov. 7, 2024

(51) Int. Cl.
| | |
|---|---|
| *H04W 4/00* | (2018.01) |
| *H04W 52/02* | (2009.01) |
| *H04W 76/28* | (2018.01) |
| *H04W 4/06* | (2009.01) |

(52) U.S. Cl.
CPC ....... *H04W 52/0216* (2013.01); *H04W 76/28* (2018.02); *H04W 4/06* (2013.01)

(58) Field of Classification Search
None
See application file for complete search history.

(56) References Cited

U.S. PATENT DOCUMENTS

2013/0159544 A1* 6/2013 Cooper ................. H04N 21/24
709/231

OTHER PUBLICATIONS

3GPP TR 23.700-47 V18.0.0 (Dec. 2022).*
S2-2305902 (Apr. 2023) (3GPP TSG-SA2 Meeting #156-e).*
"3rd Generation Partnership Project; Technical Specification Group Services and System Aspects; Study on architectural enhancements for 5G multicast-broadcast services; Phase 2 (Release 18)", 3GPP TR 23.700-47, V0.1.0, Feb. 2022, pp. 1-17.
"3rd Generation Partnership Project; Technical Specification Group Services and System Aspects; Architectural enhancements for 5G multicast-broadcast services; Stage 2 (Release 17)", 3GPP TS 23.247, V17.1.0, Dec. 2021, pp. 1-102.
"New SID: Architectural enhancements for 5G multicast-broadcast services Phase 2", TSG SA Meeting #SP-94E, SP-211645, Agenda: 9.1.3, Huawei, Dec. 14-20, 2021, pp. 1-5.

(Continued)

*Primary Examiner* — Abdelillah Elmejjarmi
(74) *Attorney, Agent, or Firm* — Carter, DeLuca & Farrell LLP

(57) ABSTRACT

An apparatus comprises one or more processors and memory storing instructions that, when executed by the one or more processors, cause the apparatus to perform operations. The operations comprise: receiving a request, wherein the request requests the RAN node to broadcast an advertisement of a multicast session, wherein the advertisement indicates that the apparatus transmits data for the multicast session in a transmission mode for inactive reception, and wherein the data transmitted in the transmission mode for inactive reception is suitable to be received by a first terminal in an inactive state; determining the apparatus is configured to transmit the data for the multicast session in the transmission mode for inactive reception; and broadcasting the advertisement in one or more cells associated with the apparatus based on the receiving the request and the determining the apparatus is configured to transmit the data for the multicast session in the transmission mode for inactive reception.

1 Claim, 5 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.

"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

"3rd Generation Partnership Project; Technical Specification Group Services and System Aspects; Multimedia Broadcast/Multicast Service (MBMS); Stage 1 (Release 17)", 3GPP TS 22.146, V17.0.0, Mar. 2022, pp. 1-18.

* cited by examiner

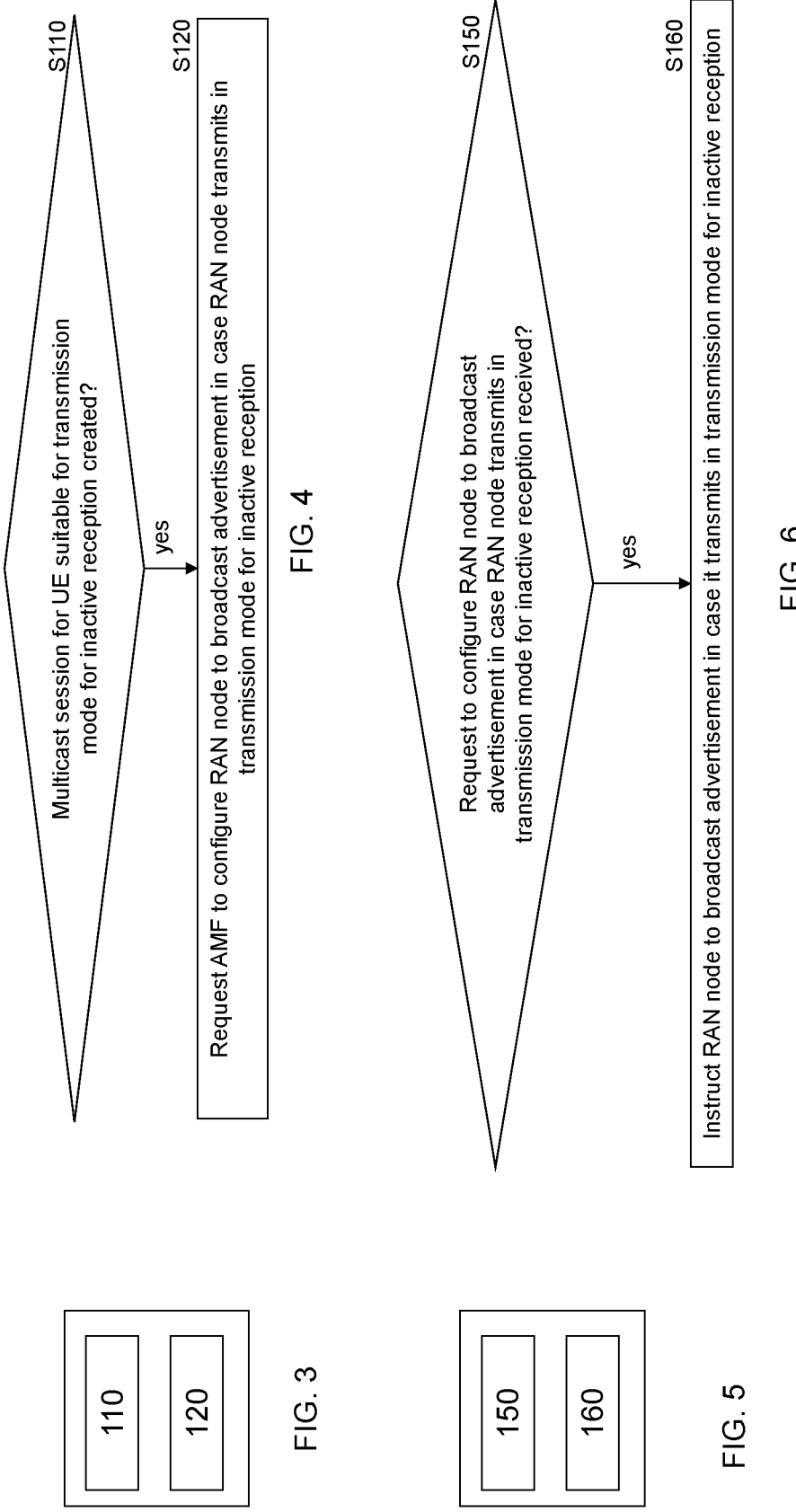

S110

Multicast session for UE suitable for transmission mode for inactive reception created?

yes

S120

Request AMF to configure RAN node to broadcast advertisement in case RAN node transmits in transmission mode for inactive reception

Request to configure RAN node to broadcast advertisement in case RAN node transmits in transmission mode for inactive reception received?

yes

S160

Instruct RAN node to broadcast advertisement in case it transmits in transmission mode for inactive reception

S210 — Request received to broadcast advertisement indicating multicast session in transmission mode for inactive reception?

yes

S215 — RAN node transmits in transmission mode for inactive reception?

yes

S220 — Broadcast advertisement periodically in cell(s) of RAN node

210

215

220

S310 — Advertisement of multicast session in transmission mode for inactive reception received by UE?

yes

S320 — UE in inactive state and wanting to receive data for the multicast session?

yes

S330 — Provide indication to cell that UE is in inactive state and wants to receive the data for the multicast session

310

320

330

810

820

TRIGGERING MBS INACTIVE RECEPTION MODE ANNOUNCEMENT

FIELD OF THE INVENTION

The present disclosure relates to multicast/broadcast services (MBS), in particular in the context of user equipment (UEs) in radio resource control (RRC) inactive mode.

ABBREVIATIONS

3GPP $3^{rd}$ Generation Partnership Project
5G/6G/7G $5^{th}/6^{th}/7^{th}$ Generation
AF Application Function
AMF Access and Mobility Management Function
AS Access Stratum
DL Downlink
gNB next Generation NodeB
IGMP Internet Group Management Protocol
LL SSM Low Layer Source Specific Multicast
MBS Multicast/Broadcast Services
MBSF Multicast/Broadcast Service Function
MB-SMF Multicast/Broadcast SMF
MB-UPF Multicast/Broadcast UPF
MLD Multicast Listener Discovery
MTC Machine Type Communication
NEF Network Exposure Function
NG-RAN Next Generation RAN
NRF Network Repository Function
PCF Policy Control Function
PLMN Public Land Mobile Network
PTM Point-to-Multipoint
QoS Quality of Service
RAN Radio Access Network
RNA RAN based Notification Area
RRC Radio Resource Control
SA System Architecture
SM Session Management
SMF Session Management Function
TMGI Temporary Mobile Group Identity
TR Technical Report
TS Technical Specification
UE User Equipment
UPF User Plane Function
WT Work Task

BACKGROUND

If a UE is in RRC inactive state, the UE AS context is stored at the UE and in gNB. Both UE and the RAN store information about the UE transition from the RRC connected state to the RRC inactive state, along with the UE's radio protocol configuration. The suspend message that transitions the UE from the RRC connected state to the RRC inactive state contains a set of parameters used for inactive state operation, such as information regarding a RAN Notification Area (RNA) within which the UE is allowed to move without notifying the network.

Multicast and Broadcast Service (MBS) is a point-to-multipoint service in which data is transmitted from a single source entity to multiple recipients (e.g., UEs), either to all users in a broadcast service area, or to users in a multicast group as defined in 3GPP TS 22.146. The corresponding types of MBS session are:
Broadcast session
Multicast session.

3GPP TS 23.247, FIG. 7.3.1-1, contains a procedure to establish broadcasted MBS sessions, as shown by FIG. 1. The operations of the procedure undertaken between elements of the network are as follows:
1. To establish broadcast MBS session, the AF performs TMGI allocation and MBS session creation. The MBS service type indicates the MBS service for the MBS session is to be broadcast service.
2. The MB-SMF may use NRF to discover the AMF(s) supporting MBS based on the MBS service area and select the appropriate one(s) of the AMF(s). Then the MB-SMF sends the Namf_MBSBroadcast_Context-Create (TMGI, LL SSM, 5G QoS Profile, MBS service area) messages to the selected AMF(s) in parallel if the service type is broadcast service. The MB-SMF may include a maximum response time in the request.
3. The transfers the N2 message in the received AMF Namf_MBSBroadcast_ContextCreate Request (TMGI, LL SSM, N2 SM information (5G QoS Profile)) message to all NG-RANs which support MBS in the MBS service area. The AMF may include the MBS service area information.
4. NG-RAN creates a Broadcast MBS Session Context, stores the TMGI, and the QoS Profile in the MBS Session Context. The LL SSM are optional parameters and only provided by MB-SMF to NG-RAN if N3mb multicast transport is configured to be used in the 5GC.
. . .
9. NG-RAN advertises the TMGI representing the MBS service over radio interface. Operation 9 can take place in parallel with operation 6.

Temporary Mobile Group Identity (TMGI) is used within MBMS to uniquely identify Multicast and Broadcast bearer services. LL SSM defines the transport multicast address for the multicast DL tunnel.

In Rel-17 MBS procedures, the distribution area of a multicast session is determined by the presence of UEs that joined the multicast session in cells. The distribution area may be further restricted by a service area defined for the multicast session: The data of the multicast session are only distributed in cells within that service area defined for the multicast session where UEs within the multicast session are present.

In shared delivery, 5GC receives a single copy of MBS data packets and delivers a single copy of those MBS packets to an NG-RAN node, which then delivers the packets to one or multiple UEs. Shared delivery may be used for broadcast and for multicast.

SUMMARY

According to a first aspect, there is provided an apparatus comprising:
one or more processors, and
memory storing instructions that, when executed by the one or more processors, cause the apparatus to perform:
monitoring whether a multicast session suitable to be transmitted in a transmission mode for inactive reception is created;
if the multicast session is created: requesting an access management function to configure one or more RAN nodes within a service area of the multicast session to broadcast an advertisement of the multicast session in case the one or more RAN nodes transmit the multicast session in the transmission mode for inactive reception, wherein the advertisement indicates that data for the multicast session are transmitted in the transmission mode for inactive reception, and the data transmitted in the transmission mode for inactive reception are suitable to be received by a terminal in an inactive state.

According to a second aspect, there is provided an apparatus comprising:

one or more processors, and memory storing instructions that, when executed by the one or more processors, cause the apparatus to perform:

monitoring whether a request to configure one or more RAN nodes to broadcast an advertisement of a multicast session in case the one or more RAN nodes transmit data for the multicast session in the transmission mode for inactive reception is received, wherein the advertisement indicates that the data for the multicast session are transmitted in the transmission mode for inactive reception, and the data transmitted in the transmission mode for inactive reception are suitable to be received by a terminal in an inactive state; and if the request is received: instructing the one or more RAN nodes to broadcast the advertisement in case the one or more RAN nodes transmit the data for the multicast session in the transmission mode for inactive reception.

According to a third aspect, there is provided an apparatus comprising:

one or more processors, and memory storing instructions that, when executed by the one or more processors, cause the apparatus to perform:

monitoring whether a RAN node receives a request, wherein the request requests the RAN node to broadcast an advertisement of a multicast session, the advertisement indicates that data for the multicast session are transmitted in a transmission mode for inactive reception, and the data transmitted in the transmission mode for inactive reception are suitable to be received by a first terminal in an inactive state;

checking if the RAN node transmits the data for the multicast session in the transmission mode for inactive reception;

broadcasting the advertisement periodically in one or several cells of the RAN node if the RAN node receives the request and the RAN node transmits the data for the multicast session in the transmission mode for inactive reception.

According to a fourth aspect, there is provided an apparatus comprising:

one or more processors, and memory storing instructions that, when executed by the one or more processors, cause the apparatus to perform:

monitoring whether a terminal receives, from a cell, an advertisement indicating that data for a multicast session are to be transmitted in a transmission mode for inactive reception, wherein the data transmitted in the transmission mode for inactive reception are suitable to be received by the terminal in an inactive state;

checking whether the terminal is in the inactive state and wants to receive the data for the multicast session;

providing an indication to the cell that the terminal is in the inactive state and wants to receive the data for the multicast session if the terminal receives the advertisement, is in the inactive state, and wants to receive the data for the multicast session.

According to a fifth aspect, there is provided a method comprising:

monitoring whether a multicast session suitable to be transmitted in a transmission mode for inactive reception is created;

if the multicast session is created: requesting an access management function to configure one or more RAN nodes within a service area of the multicast session to broadcast an advertisement of the multicast session in case the one or more RAN nodes transmit the multicast session in the transmission mode for inactive reception, wherein the advertisement indicates that data for the multicast session are transmitted in the transmission mode for inactive reception, and the data transmitted in the transmission mode for inactive reception are suitable to be received by a terminal in an inactive state.

The method may further comprise:

providing, if the multicast session is created, at least one of an identifier of the multicast session, a service area of the multicast session, and assistance information indicating whether or not applying the transmission mode for inactive reception for the multicast session is recommended.

According to a sixth aspect, there is provided a method comprising:

monitoring whether a request to configure one or more RAN nodes to broadcast an advertisement of a multicast session in case the one or more RAN nodes transmit data for the multicast session in the transmission mode for inactive reception is received, wherein the advertisement indicates that the data for the multicast session are transmitted in the transmission mode for inactive reception, and the data transmitted in the transmission mode for inactive reception are suitable to be received by a terminal in an inactive state; and if the request is received: instructing the one or more RAN nodes to broadcast the advertisement in case the one or more RAN nodes transmit the data for the multicast session in the transmission mode for inactive reception.

The method may further comprise:

providing, to the one or more RAN nodes, if the request is received, at least one of an identifier of the multicast session, and assistance information indicating whether or not applying the transmission mode for inactive reception for the multicast session is recommended.

The request may comprise an indication of a service area of the multicast session, and the method may further comprise:

determining the one or more RAN nodes based on the service area if the request is received; wherein the instructing comprises instructing the determined one or more RAN nodes to broadcast the advertisement of the multicast session in the service area in case the one or more RAN nodes transmit the multicast session in the transmission mode for inactive reception.

According to a seventh aspect, there is provided a method comprising:

monitoring whether a RAN node receives a request, wherein the request requests the RAN node to broadcast an advertisement of a multicast session, the advertisement indicates that data for the multicast session are transmitted in a transmission mode for inactive reception, and the data transmitted in the transmission mode for inactive reception are suitable to be received by a first terminal in an inactive state;

checking if the RAN node transmits the data for the multicast session in the transmission mode for inactive reception;

broadcasting the advertisement periodically in one or several cells of the RAN node if the RAN node receives the request and the RAN node transmits the data for the multicast session in the transmission mode for inactive reception.

The request requesting the RAN node to broadcast the advertisement of the multicast session may comprise at least one of an identifier of the multicast session, and assistance information indicating whether or not applying the transmission mode for inactive reception for transmitting the data for the multicast session is preferred.

The request may comprise an indication of a service area of the multicast session, and the method may further comprise determining the one or several cells based on the service area received in the request.

The method may further comprise determining, for each cell of the one or several cells, whether or not the RAN node transmits the data for the multicast session in the transmission mode for reception in inactive state or in a transmission mode for reception in connected state, wherein the determination is based on at least on one of the following criteria: whether or not the RAN node receives the request to broadcast the advertisement, number of terminals wanting to receive the multicast session in the cell; RRC state of terminals in the multicast session in the cell; load in the cell; capabilities of terminals that have joined the multicast session in the cell to receive data for the multicast session while in inactive state, and further assistance information received as part of the request to broadcast.

The method may further comprise for each of the one or several cells:

broadcasting the advertisement if it is determined to transmits the data for the multicast session in the transmission mode for reception in inactive state; and inhibiting the broadcasting the advertisement if it is determined to transmits the data for the multicast session in the transmission mode for reception in connected state.

The method may further comprise for each of the one or several cells:

broadcasting the advertisement including an indication of the determined transmission mode.

The method may further comprise:

supervising, for each of the one or several cells, whether the RAN node receives an indication that the first terminal desires to receive the data for the multicast session;

multicasting the data for the multicast session in the cell in the transmission mode for reception in inactive state if the cell receives the indication.

The indication that the first terminal desires to receive the data for the multicast session may comprise at least one of an interest indication and a preamble.

The method may further comprise:

supervising for each of the one or several cells whether at least one second terminal in connected state that joined the multicast session is in the cell;

multicasting the data for the multicast session in the cell if second terminal in connected state that joined the multicast session is in the cell.

The method may further comprise:

inhibiting the multicasting the data for the multicast session in the cell if the cell does not receive the indication and none of the at least one second terminal in the connected state that joined the multicast session is in the cell.

The method may further comprise:

requesting the establishment of shared data delivery for the multicast session when starting to multicast the data for the multicast session.

According to an eighth aspect, there is provided a method comprising:

monitoring whether a terminal receives, from a cell, an advertisement indicating that data for a multicast session are to be transmitted in a transmission mode for inactive reception, wherein the data transmitted in the transmission mode for inactive reception are suitable to be received by the terminal in an inactive state;

checking whether the terminal is in the inactive state and wants to receive the data for the multicast session;

providing an indication to the cell that the terminal is in the inactive state and wants to receive the data for the multicast session if the terminal receives the advertisement, is in the inactive state, and wants to receive the data for the multicast session.

The indication may comprise at least one of an interest indication and a preamble.

The method may further comprise:

providing a request to transition to a connected state if the terminal does not receive the advertisement during a predetermined time period, is in the inactive state, and wants to receive the data for the multicast session.

Each of the methods of the fifth to eighth aspects may be a method of multicasting.

According to a ninth aspect, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some embodiments of the embodiments described herein, at least one of the following advantages may be achieved:

UEs in RRC inactive state may receive MBS;

Transmission of MBS may be restricted to cells with UEs interested in the MBS.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, and advantages are apparent from the following detailed description of the embodiments which is to be taken in conjunction with the appended drawings, wherein:

FIG. 3 shows an example apparatus according to an example embodiment;

FIG. 4 shows an example method that may be implemented by the example apparatus of FIG. 3 according to an example embodiment;

FIG. 5 shows an example apparatus according to an example embodiment;

FIG. 6 shows an example method that may be implemented by the example apparatus of FIG. 5 according to an example embodiment;

DETAILED DESCRIPTION OF CERTAIN EMBODIMENTS

Herein below, certain embodiments are described in detail with reference to the accompanying drawings, wherein the features of the embodiments can be freely combined with each other unless otherwise described. However, it is to be expressly understood that the description of certain embodiments is given by way of example only, and is by no way intended to be understood as limiting the embodiments to the only the disclosed details.

Moreover, it is to be understood that the apparatus is configured to perform the corresponding method, although in some cases only the apparatus or only the method are described.

For inactive UEs, the location of a UE is not known at cell level, only at RNA level, wherein a RNA typically comprises plural cells. A RNA is configured by NG-RAN. UEs can move between the cells of the RNA without notifying NG-RAN on the cell they are located in (see 3GPP TS 38.300).

According to some example embodiments, inactive UE(s) may receive a broadcasted advertisement that MBS multicast session with transmission mode for inactive reception (i.e., suitable to be received by a terminal in RRC inactive state) is available in the cell where the inactive UE(s) are located. After reception of such advertisement, an inactive UE may indicate that it wants to join the multicast session in RRC inactive state.

Figure 1:
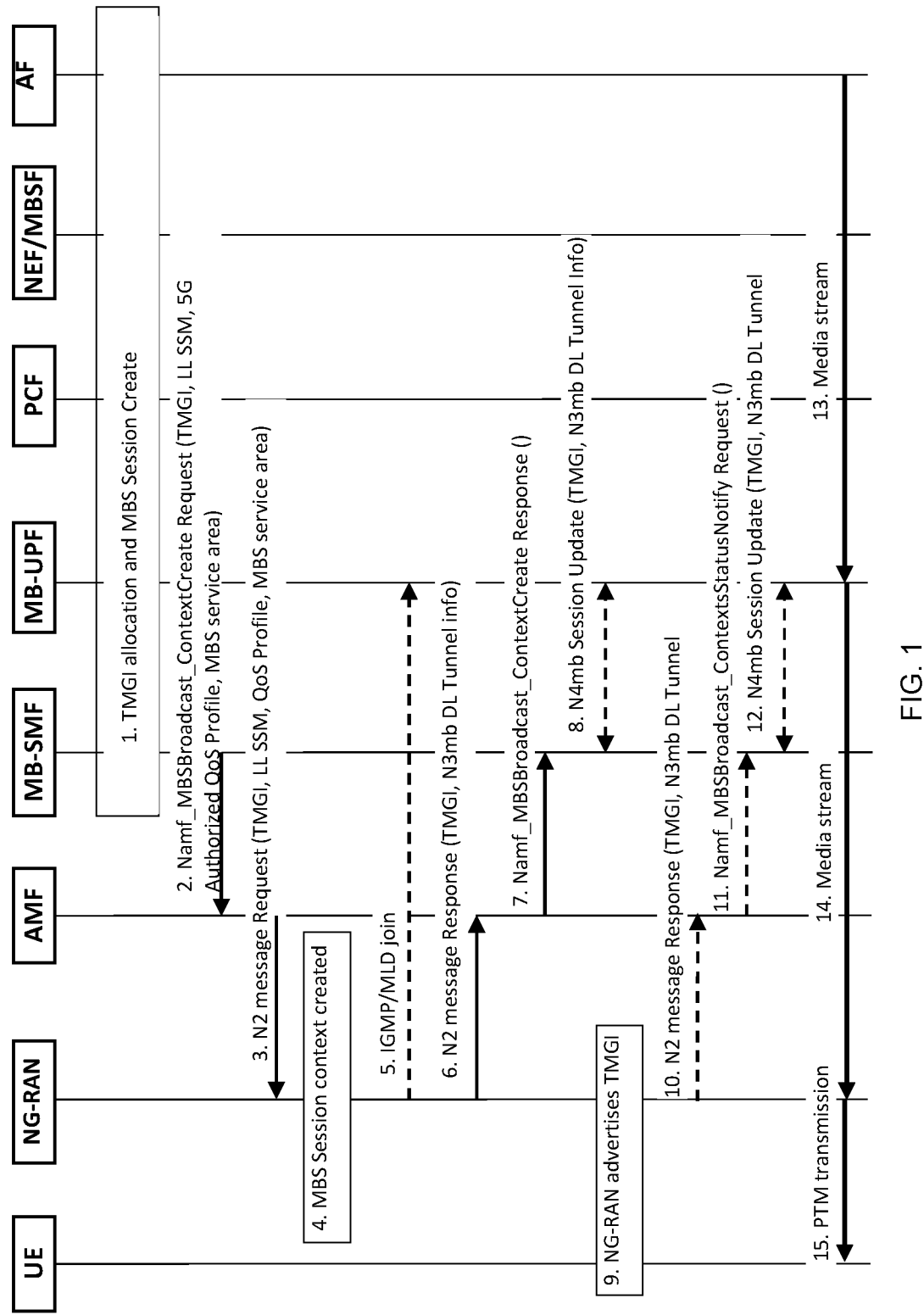
FIG. 1 shows a message sequence chart according to 3GPP TS 23.247.
Figure 2:
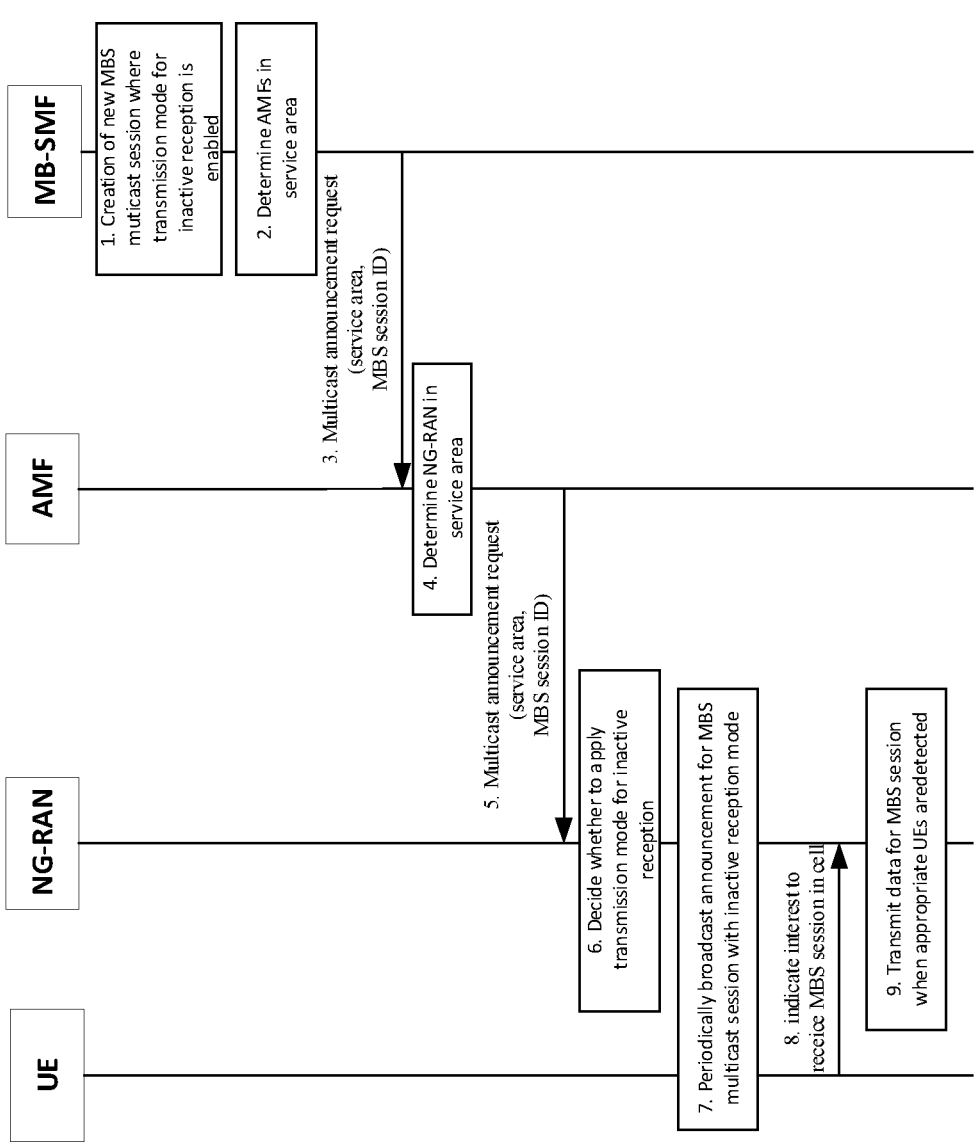
FIG. 2 shows a message sequence chart according to some example embodiments.

FIG. 2 shows a message sequence chart according to some example embodiments. In detail, as shown in FIG. 2, at operation 1, the MB-SMF creates an MBS multicast session that is enabled to be transmitted in the transmission mode for inactive reception. The MB-SMF will send a message requesting an announcement of the MBS multicast session when it is finally decided (e.g., by RAN) that the multicast session is to be transmitted in the transmission mode for inactive reception. At operation 2 of FIG. 2, the MB-SMF may determine AMF(s) in the service area of the MBS multicast session. At operation 3 of FIG. 2, MB-SMF sends the message requesting the announcement to AMF(s) (typically: to all AMF(s)) in the service area of the MBS session (or in the entire PLMN if multicast session has no assigned service area) and indicates the service area. The message may contain information concerning a service area, an identifier of the multicast session, and assistance information. The assistance information may assist (e.g., the RAN) in determining whether to apply the transmission mode for inactive reception or a transmission mode for connected reception, and may for instance indicate a preference for one of those transmission modes. Absence of the assistance information may be interpreted as a recommendation to apply the transmission mode for inactive reception or the transmission mode for connected reception, depending on implementation. For example, the message may be a Namf_MBSBroadcast_ContextCreate Request with an indication (e.g., the assistance information) that this message is for requesting the announcement of the MBS multicast session in the transmission mode for inactive reception. As another option, a new message with corresponding semantics may be used, or some other existing message may be accordingly adapted (e.g., via operations 1 to 3 of FIG. 2). Note that a UE in RRC inactive state may not receive data if the data are transmitted in the transmission mode for connected reception. In one embodiment, data transmitted in the transmission mode for inactive reception may be suitable for being received by a UE in the RRC idle state, too.

In operation 4 of FIG. 2, the AMF(s) may determine RAN node(s) (e.g., NG-RAN node(s)) in service area controlled by the respective AMF, and in operation 5 of FIG. 2, the AMF(s) send a request for the announcement of the MBS multicast session in inactive transmission mode to those RAN node(s) that were determined. The request may indicate the service area or the part of the service area handled by the RAN node. In one embodiment, if the request does not comprise an indication of the service area, the RAN node may assume that the entire area handled by the RAN node belongs to the service area (operations 4 and 5 in FIG. 2).

If a RAN node receives the request for the announcement of the MBS multicast session in transmission mode for inactive reception, the RAN node may act as follows:

In some example embodiments, the RAN node may take the request to send the advertisement as an instruction to send data for the MBS multicast session in the transmission mode for inactive reception. In some example embodiments, the RAN node may determine the transmission mode, taking into account that the RAN node received the request to send the advertisement and operationally other criteria. Other criteria may comprise, for example, a number of UEs (e.g., terminals) wanting to receive the multicast session in the cell; the RRC states of UEs (e.g., terminals) in the multicast session in the cell; load in the cell; capabilities of UEs that have joined the multicast session in the cell to receive data for the multicast session while in inactive state, and further assistance information received as part of the request to broadcast. The RAN node may decide (operation 6 of FIG. 2), for each cell of the service area covered by that RAN node, whether to apply the transmission mode for inactive reception (i.e., configure data suitable to be received by a UE in RRC inactive state and by a UE in RRC connected state) or the transmission mode for connected reception (i.e., configure data suitable to be received by a UE in RRC connected state but not by a UE in RRC inactive state).

If the RAN node finally decides to send the data for the MBS multicast session in the transmission mode for inactive reception, the RAN node may advertise the support of a multicast session in the cells (determined via operation 6 of FIG. 2) via a broadcast (operations 6 and 7 in FIG. 2). For example, the RAN node may advertise from time to time or may periodically advertise the support of a multicast session in the cells (determined via operation 6 of FIG. 2) via a broadcast (operations 6 and 7 in FIG. 2). The Ran node may select the cells based on the received service area. In the broadcast, the RAN node may indicate that it uses the transmission mode for inactive reception. In some example embodiments, the RAN node may only perform the broadcast if the RAN node applies (decided to apply) the transmission mode for inactive reception.

After the RAN node has advertised the support of the multicast session, the RAN node may wait for an indication of a UE in RRC inactive state in the cell that the UE desires to receive the data for the multicast session. If the RAN node receives such an indication, the RAN node transmits data for the multicast session in the cell (operations 8 and 9 in FIG. 2). The Ran node also transmits the data for the multicast session if a connected UE within the MBS session arrives in the cell. When RAN node starts to transmit data for the multicast session, the RAN node typically requests the establishment of shared delivery of data for the multicast session from the core network towards itself.

In one embodiment, a UE in inactive state desiring to receive data for the multicast session and not receiving from the RAN node the indication that the transmission mode for inactive reception is applied for the multicast session may request to transition to connected state.

In one embodiment, a UE in inactive state desiring to receive data for the multicast session and receiving the indication that the transmission mode for inactive reception is applied for the multicast session may send in the cell where the UE is located an indication that the UE desires to receive the data for the multicast session. The indication may be in the form of an interest indication, or a preamble sent while the UE is in inactive state.

In some example embodiments, the RAN node does not request the termination of shared delivery for the multicast session when the last UE in RRC connected state leaves the RAN node. The RAN node may also continue the radio transmission of the data for the multicast session because a UE in RRC inactive state still might be within the MBS session, e.g., utilizing the MBS session.

The RAN node may store information about the AMF requesting the announcement of the MBS multicast session in transmission mode for inactive reception, and use the information about the AMF to send subsequent interactions related to the multicast session to the same AMF, for instance interaction such as the request for the establishment or termination of shared delivery of data for the multicast session.

FIG. 3 shows an example apparatus according to an example embodiment. The apparatus may be a session management function (such as a MB-SMF) or an element thereof. FIG. 4 shows an example method that may be implemented by the example apparatus of FIG. 3 according to an example embodiment. The apparatus according to FIG. 3 may perform the method of FIG. 4 but is not limited to performance of this method. The method of FIG. 4 may be performed by the apparatus of FIG. 3 but is not limited to being performed by this apparatus.

The apparatus of FIG. 3 comprises first element 110 and second element 120. In one embodiment, the first element comprises means for monitoring 110 and the second element comprises means for requesting 120. The means for monitoring 110 and means for requesting 120 may be a monitoring means and requesting means, respectively. The means for monitoring 110 and means for requesting 120 may include a monitoring processor and requesting processor, respectively, that execute instructions stored in memory (not show).

Alternatively in one embodiment, the apparatus of FIG. 3 comprises monitor 110 as the first element and requester 120 as the second element. The monitor and requestor may be implemented by at least one processor and a memory that stores instructions that when executed by the at least one processor, cause the apparatus to perform the operations of FIG. 4. In another alternative embodiment, the apparatus comprises monitoring circuitry 110 and requesting circuitry 120 for performing respective portions of the example method of FIG. 4. As used in this application, the term "circuitry" may refer to one or more or all of the following:
   (a) hardware-only circuit implementations (such as implementations in only analog and/or digital circuitry) and
   (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory (ies) that work together to cause an apparatus, such as a mobile phone or server, to perform various functions) and
   (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 3 apparatus first element 110 (e.g., means for monitoring 110) is configured to monitor whether a multicast session suitable (e.g., configured) to be transmitted in a transmission mode for inactive reception is created (S110). If the multicast session is created (S110=yes), FIG. 3 apparatus second element 120 (e.g., means for requesting 120) requests an access management function (such as an AMF) to configure one or more RAN nodes within a service area of the multicast session to broadcast an advertisement of the multicast session in case the one or more RAN nodes transmit the multicast session in the transmission mode for inactive reception (S120). The advertisement indicates that data for the multicast session are transmitted in the transmission mode for inactive reception. The data transmitted in the transmission mode for inactive reception are suitable to be received (e.g., configured so as to be receivable) by a terminal in an inactive state.

Alternatively, FIG. 3 apparatus first element 110 (e.g., monitor 110) may determine a multicast session suitable (e.g., so configured) to be transmitted in a transmission mode for inactive reception is created (S110: yes). Thereafter, the FIG. 3 apparatus second element 120 (e.g., requestor 120) may cause transmission of a request that an access management function (such as an AMF) configure one or more RAN nodes within a service area of the multicast session to broadcast an advertisement of the multicast session if the one or more RAN nodes are capable of transmitting the multicast session in the transmission mode for inactive reception (S120).

FIG. 5 shows an example apparatus according to an example embodiment. The apparatus may be an access management function (such as an AMF) or an element thereof. FIG. 6 shows an example method at may be implemented by the example apparatus of FIG. 5 according to an example embodiment. The apparatus according to FIG. 5 may perform the method of FIG. 6 but is not limited to this method. The method of FIG. 6 may be performed by the apparatus of FIG. 5 but is not limited to being performed by this apparatus.

FIG. 5 apparatus comprises first element 150 and second element 160 (e.g., means for monitoring 150 and means for instructing 160, monitor 150 and instructor 160, or monitoring circuitry 150 and instructing circuitry 160). The means for monitoring 150 and means for instructing 160 may be a monitoring means and instructing means, respectively. The means for monitoring 150 and means for instructing 160 may include a monitoring processor and instructing processor, respectively, that execute instructions stored in memory (not shown). Alternatively, the monitor 150 and instructor 160 may be implemented by at least one processor and memory that stores instructions that when executed by the at least one processor, cause the apparatus to perform the operations of FIG. 6. In another alternative embodiment, the FIG. 5 apparatus comprises monitoring circuitry 110 and instructing circuitry 120 for performing respective portions of the example method of FIG. 6.

FIG. 5 apparatus first element 150 (e.g., means for monitoring 150) is configured to monitor whether a request to configure one or more RAN nodes to broadcast an advertisement of a multicast session in the case the one or more RAN nodes transmit data for the multicast session in a transmission mode for inactive reception is received (S150). The advertisement indicates that data for the multicast session are transmitted in the transmission mode for inactive reception. The data transmitted in the transmission mode for inactive reception are suitable to be received by a terminal in an inactive state (e.g., configured so as to be receivable by the terminal in the inactive state). If the request is received (S150=yes), the method continues to operation S160.

If such a request is received (S150=yes), the FIG. 5 second element 160 (e.g., means for instructing 160) instructs the one or more RAN nodes to broadcast the advertisement in the case the one or more RAN nodes transmit the data for the multicast session in the transmission mode for inactive reception (S160).

Alternatively, FIG. 5 apparatus first element 150 (e.g., monitor 150) may determine a reception (e.g., receiving) of a request to configure one or more RAN nodes to broadcast an advertisement of a multicast session in an instance that the one or more RAN nodes are capable of transmitting data for the multicast session in a transmission mode for inactive reception (S150: yes). Thereafter, the FIG. 5 apparatus second element 160 (e.g., instructor 160) may cause generation and transmission of an instruction that the one or more RAN nodes are to broadcast the advertisement in the instance the one or more RAN nodes can capable of transmitting the data for the multicast session in the transmission mode for inactive reception (S160).

Figure 8:
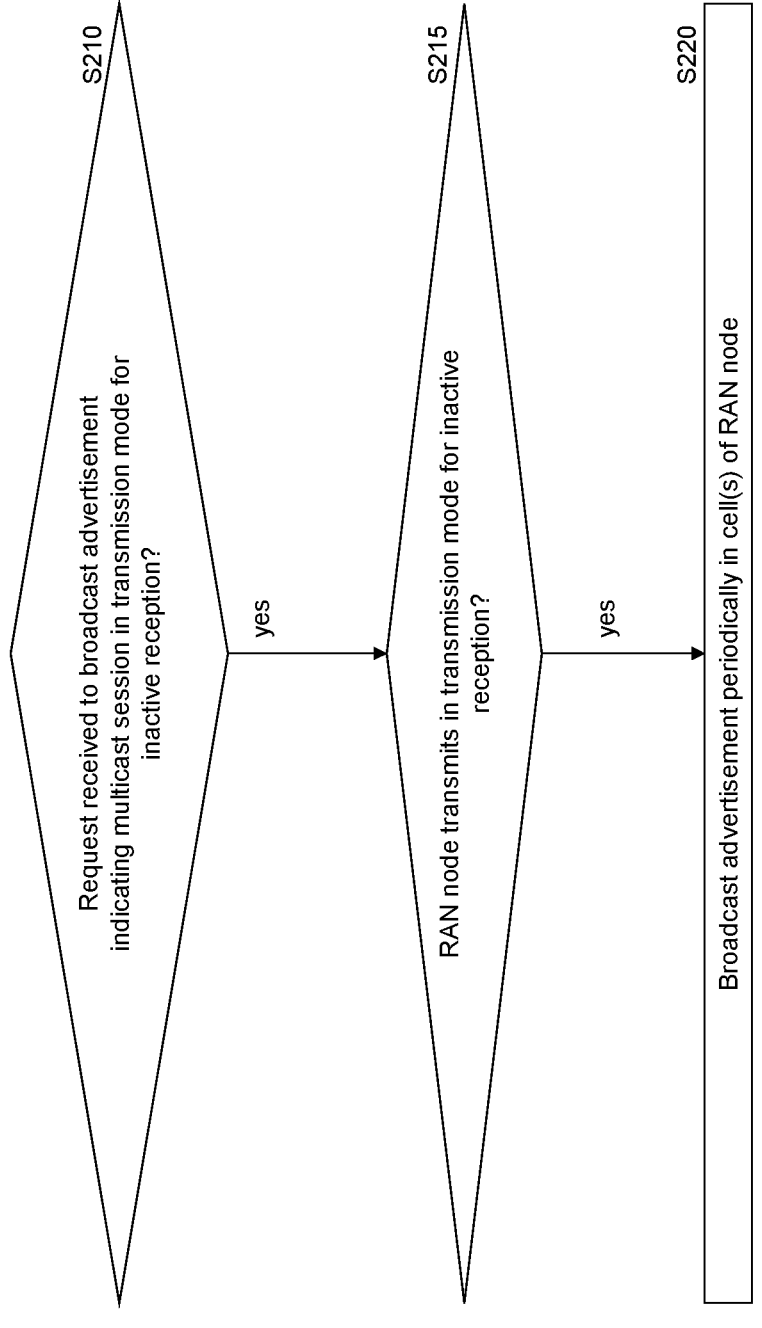
FIG. 8 shows an example method that may be implemented by the example apparatus of FIG. 7 according to an example embodiment.
Figure 7:
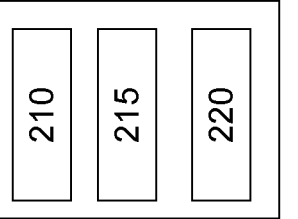
FIG. 7 shows an example apparatus according to an example embodiment.

FIG. 7 shows an example apparatus according to an example embodiment. The apparatus may be a cell represented by a respective RAN node (such as a gNB or eNB) or an element thereof. FIG. 8 shows an example method at may be implemented by the example apparatus of FIG. 7 according to an example embodiment. The apparatus according to FIG. 7 may perform the method of FIG. 8 but is not limited to this method. The method of FIG. 8 may be performed by the apparatus of FIG. 7 but is not limited to being performed by this apparatus.

The apparatus of FIG. 7 comprises a first element 210, a second element 220, and a third element 230 (e.g., means for monitoring 210, means for checking 215, and means for broadcasting 220). The means for monitoring 210, means for checking 215, and means for broadcasting 220 may be a monitoring means, checking means, and broadcasting means, respectively. The means for monitoring 210, means for checking 215, and means for broadcasting 220 may include a monitoring processor, checking processor, and broadcasting processor, respectively, that execute instructions stored in a memory (not shown. Alternatively, the apparatus of FIG. 7 comprises a monitor 210 as the first element, a checker 215 as the second element, and broadcaster 220 as the third element. The monitor, checker, and broadcaster may be implemented by at least one processor and a memory that stores instructions that when executed by the at least one processor, cause the apparatus to perform the operations of FIG. 8. In another alternative embodiment, the apparatus comprises monitoring circuitry 210, checking circuitry 215, and broadcaster circuitry 220 for performing respective portions of the example method of FIG. 4.

FIG. 7 apparatus first element 210 (e.g., means for monitoring 210) is configured to monitor whether a RAN node receives a request (S210). The request is configured to request the RAN node to broadcast an advertisement of a multicast session. The advertisement is configured to indicate that the RAN node transmits data for the multicast session in a transmission mode for inactive reception. The data transmitted in the transmission mode for inactive reception are suitable to be received by a terminal in an inactive state (e.g., configured so as to be receivable by the terminal in the inactive state). If the request is received (S210=yes), the method May continues to operation S215 in FIG. 7.

FIG. 7 apparatus second element 215 (e.g., means for checking 215) checks if the RAN node transmits the data for the multicast session in the transmission mode for inactive reception (S215). It is noted that operations S210 and S215 may be performed in an arbitrary sequence. In addition, operations S210 and S215 may be performed fully of partly in parallel.

As shown in FIG. 8, if the apparatus receives the request (S210=yes) and the RAN node transmits the data for the multicast session in the transmission mode for inactive reception (S215=yes), the third element 220 (e.g., means for broadcasting 220) broadcasts the advertisement in one or more cells of the RAN node (S220) (e.g., broadcast in several cells). In one embodiment, the advertisement broadcast by the means for broadcasting 220 is broadcast periodically in one or more cells of the RAN node (S220). In another embodiment, the advertisement may be broadcast intermittently by the means for broadcasting 220 in one or more (e.g., several) cells of the RAN node (S220).

Alternatively, FIG. 7 apparatus first element 210 (e.g., monitor 210) may determine a reception (e.g., receiving) of a request to broadcast an advertisement of a multicast session if the RAN node is capable of transmitting data for the multicast session in a transmission mode for inactive reception (S210: yes). Thereafter, the FIG. 7 apparatus second element 215 (e.g., checker 215) may determine the RAN node is capable of transmitting the data for the multicast session in the transmission mode for inactive reception (S215=yes). Thereafter, the FIG. 7 apparatus third element 220 (e.g., broadcaster 220) is configure to cause broadcast of the advertisement of the multicast session in one or more cells of the RAN node (S220) (e.g., broadcast in several cells). In one embodiment, the advertisement broadcast by the broadcaster 220 is broadcast periodically in one or more cells of the RAN node (S220). In another embodiment, the advertisement may be broadcast intermittently by the broadcaster 220 in one or more (e.g., several) cells of the RAN node (S220)).

Figures 9, 10, 11:
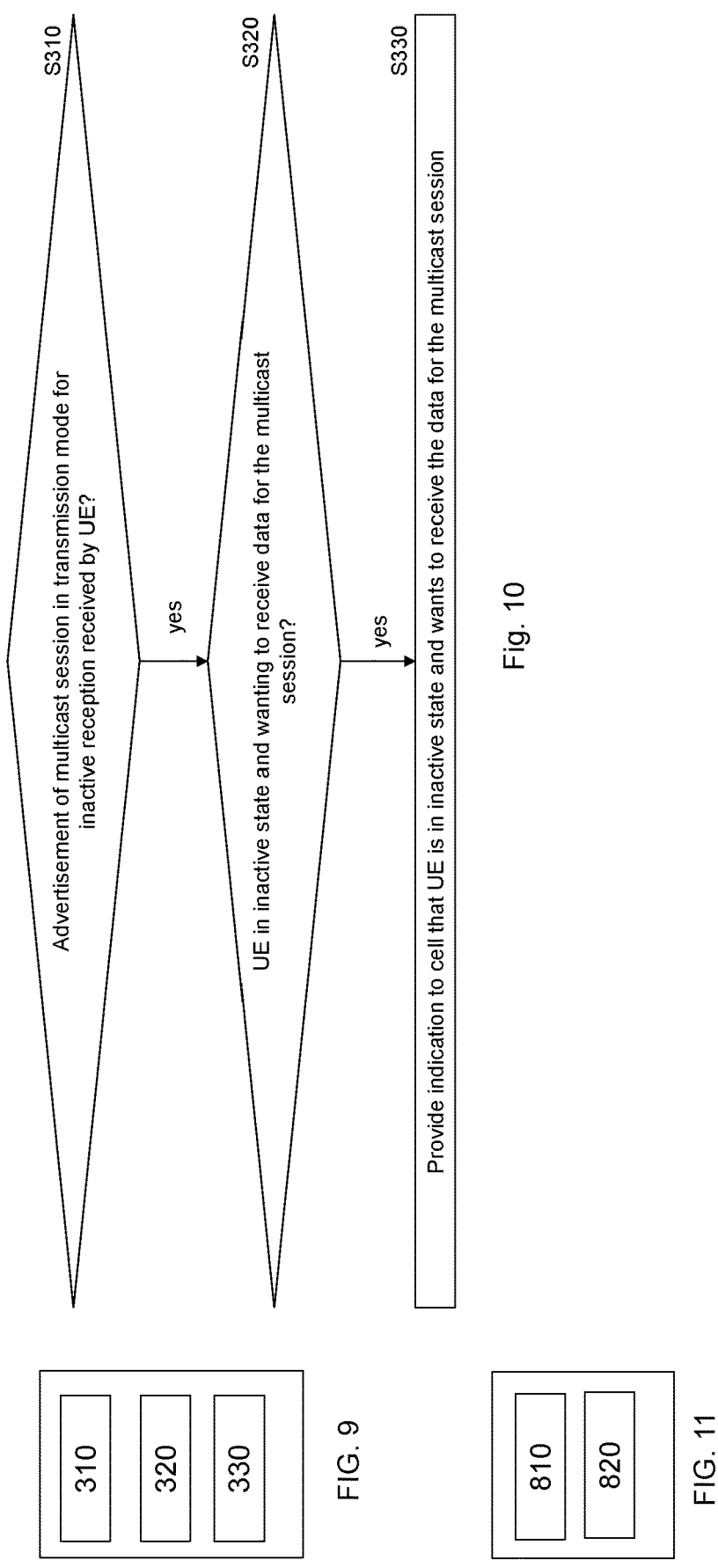
FIG. 9 shows an example apparatus according to an example embodiment.
FIG. 10 shows an example method that may be implemented by the example apparatus of FIG. 9 according to an example embodiment.
FIG. 11 shows an apparatus according to an example embodiment.

FIG. 9 shows an example apparatus according to an example embodiment. The apparatus may be a terminal (such as a UE or a MTC device) or an element thereof. FIG. 10 shows an example method at may be implemented by the example apparatus of FIG. 9 according to an example embodiment. The apparatus according to FIG. 9 may perform the method of FIG. 10 but is not limited to this method. The method of FIG. 10 may be performed by the apparatus of FIG. 9 but is not limited to being performed by this apparatus.

FIG. 9 apparatus comprises a first element 310, a second element 320, and a third element 330 (e.g., means for monitoring 310, means for checking 320, and means for providing 330). The means for monitoring 310, means for checking 320, and means for providing 330 may be a monitoring means, checking means, and providing means, respectively. The means for monitoring 310, means for checking 320, and means for providing 330 may be a monitoring processor, checking processor, and providing processor, respectively, that execute instruction stored in memory (not shown). Alternatively, in one embodiment, the apparatus of FIG. 9 comprises monitor 310 as the first element, checker 320 as the second element, and provider 330 as the third element. The monitor, checker, and provider may be implemented by at least one processor and a memory that stores instructions that when executed by the at least one processor, cause the apparatus to perform the operations of FIG. 10. In another alternative embodiment, the apparatus comprises monitoring circuitry 310, checking circuitry 320, and providing circuitry 330 for performing respective portions of the example method of FIG. 10.

FIG. 9 apparatus first element 310 (e.g., means for monitoring 310) is configured to monitor whether a terminal receives, from a cell, an advertisement indicating that data for a multicast session are transmitted in a transmission mode for inactive reception (S310). The data transmitted in the transmission mode for inactive reception are suitable to be received by a terminal in an inactive state. (e.g., configured so as to be receivable by the terminal in the inactive state). If the advertisement is received (S310=yes), the method continues to operation S160.

FIG. 9 apparatus second element 320 (e.g., means for checking 320) checks whether the terminal is in the inactive state and desires to receive the data for the multicast session (S320). It is noted that operations S310 and S320 may be performed in an arbitrary sequence. In addition, operations S310 and 320 may be performed fully or partly in parallel.

As shown in FIG. 10, if the terminal receives the advertisement (S310=yes), and the terminal is in the inactive state and wants to join the multicast session (S320=yes), FIG. 9 apparatus third element 330 (e.g., means for providing 330) provides an indication to the cell that the terminal is in the inactive state and wants to receive the data for the multicast session (S330). The indication may comprise at least one of an interest indication and a preamble.

FIG. 11 shows an apparatus according to an example embodiment. The apparatus comprises at least one processor 810, at least one memory 820 including computer program code, and the at least one processor 810, with the at least one memory 820 and the computer program code, being configured to cause the apparatus to at least perform at least the method according to at least one of FIGS. 4, 6, 8, and 10 and related description.

Some example embodiments are explained with respect to a 5G network. However, the embodiments described herein are not limited to 5G implementations. Implementations of the described embodiments may be used in other communication networks using satellites with earth-moving cells, and additionally, e.g. in previous rf forthcoming generations of 3GPP networks such as 4G, 6G, or 7G, etc.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, and are equivalent as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments provide, for example, a core network function (such as a SMF (in particular a MB-SMF) or an AMF), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments provide, for example, a RAN node (such as a base station, e.g. gNB or eNB, etc.) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments provide, for example, a terminal (such as a UE, an IoT device etc.) or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered preferred example embodiments. However, it should be noted that the description of the preferred example embodiments is given by way of example only and that various modifications may be made without departing from the scope of the invention as defined by the appended claims.

The phrase "at least one of A and B" comprises the options only A, only B, and both A and B. The terms "first X" and "second X" include the options that "first X" is the same as "second X" and that "first X" is different from "second X", unless otherwise specified.

Various aspects of the described embodiments are detailed in the following numbered paragraphs:

1. A first apparatus comprising:
    one or more processors, and
    memory storing instructions that, when executed by the one or more processors, cause the apparatus to perform:
    monitoring whether a multicast session suitable to be transmitted in a transmission mode for inactive reception is created;
    if the multicast session is created: requesting an access management function to configure one or more RAN nodes within a service area of the multicast session to broadcast an advertisement of the multicast session in case the one or more RAN nodes transmit the multicast session in the transmission mode for inactive reception, wherein the advertisement indicates that data for the multicast session are transmitted in the transmission mode for inactive reception, and the data transmitted in the transmission mode for inactive reception are suitable to be received by a terminal in an inactive state.

2. The first apparatus according to any of the above, wherein the instructions, when executed by the one or more processors, further cause the apparatus to perform:
    providing, if the multicast session is created, at least one of an identifier of the multicast session, a service area of the multicast session, and assistance information indicating whether or not applying the transmission mode for inactive reception for the multicast session is recommended.

3. A second apparatus comprising:
    one or more processors, and
    memory storing instructions that, when executed by the one or more processors, cause the apparatus to perform:
    monitoring whether a request to configure one or more RAN nodes to broadcast an advertisement of a multicast session in case the one or more RAN nodes transmit data for the multicast session in the transmission mode for inactive reception is received, wherein the advertisement indicates that the data for the multicast session are transmitted in the transmission mode for inactive reception, and the data transmitted in the transmission mode for inactive reception are suitable to be received by a terminal in an inactive state; and
    if the request is received: instructing the one or more RAN nodes to broadcast the advertisement in case the one or more RAN nodes transmit the data for the multicast session in the transmission mode for inactive reception.

4. The second apparatus according to any of the above, wherein the instructions, when executed by the one or more processors, further cause the apparatus to perform:
    providing, to the one or more RAN nodes, if the request is received, at least one of an identifier of the multicast session, and assistance information indicating whether or not applying the transmission mode for inactive reception for the multicast session is recommended.

5. The second apparatus according to any of the above, wherein the request comprises an indication of a service area of the multicast session, and the instructions, when executed by the one or more processors, further cause the apparatus to perform:
    determining the one or more RAN nodes based on the service area if the request is received; wherein
    the instructing comprises instructing the determined one or more RAN nodes to broadcast the advertisement of the multicast session in the service area in case the one or more RAN nodes transmit the multicast session in the transmission mode for inactive reception.

6. A third apparatus comprising:
    one or more processors, and
    memory storing instructions that, when executed by the one or more processors, cause the apparatus to perform:
    monitoring whether a RAN node receives a request, wherein the request requests the RAN node to broadcast an advertisement of a multicast session, the advertisement indicates that the RAN node transmits data for the multicast session in a transmission mode for inactive reception, and the data transmitted in the transmission mode for inactive reception are suitable to be received by a first terminal in an inactive state;
    checking if the RAN node transmits the data for the multicast session in the transmission mode for inactive reception
    broadcasting the advertisement periodically in one or several cells of the RAN node if the RAN node receives the request and the RAN node transmits the data for the multicast session in the transmission mode for inactive reception.

7. The third apparatus according to any of the above, wherein the request requesting the RAN node to broadcast the advertisement of the multicast session comprises at least one of an identifier of the multicast session, and assistance information indicating whether or not applying the transmission mode for inactive reception for transmitting the data for the multicast session is preferred.

8. The third apparatus according to any of the above, wherein the request comprises an indication of a service area of the multicast session, and the instructions, when executed by the one or more processors, cause the apparatus to perform:
    determining the one or several cells based on the service area received in the request.

9. The third apparatus according to any of the above, wherein the instructions, when executed by the one or more processors, cause the apparatus to perform:
    determining, for each cell of the one or several cells, whether or not the RAN node transmits the data for the multicast session in the transmission mode for reception in inactive state or in a transmission mode for reception in connected state, wherein the determination is based on at least on one of the following criteria: whether or not the RAN node receives the request to broadcast the advertisement, number of terminals wanting to receive the multicast session in the cell; RRC state of terminals in the multicast session in the cell; load in the cell; capability of terminals that have joined the multicast session in the cell to receive data for the multicast session while in inactive state, and further assistance information received as part of the request to broadcast.

10. The third apparatus according to any of the above, wherein the instructions, when executed by the one or more processors, cause the apparatus to perform for each of the one or several cells:

broadcasting the advertisement if it is determined to transmits the data for the multicast session in the transmission mode for reception in inactive state; and inhibiting the broadcasting the advertisement if it is determined to transmits the data for the multicast session in the transmission mode for reception in connected state.

11. The third apparatus according to any of the above, wherein the instructions, when executed by the one or more processors, cause the apparatus to perform:

broadcasting the advertisement including an indication of the determined transmission mode.

12. The third apparatus according to any of the above, wherein the instructions, when executed by the one or more processors, cause the apparatus to perform for each of the one or several cells:

supervising, for each of the one or several cells, whether the RAN node receives an indication that the first terminal desires to receive the data for the multicast session;

multicasting the data for the multicast session in the cell in the transmission mode for reception in inactive state if the cell receives the indication.

13. The third apparatus according to any of the above, wherein the indication that the first terminal desires to receive the data for the multicast session comprises at least one of an interest indication and a preamble.

14. The third apparatus according to any of the above, wherein the instructions, when executed by the one or more processors, cause the apparatus to perform:

supervising for each of the one or several cells whether at least one second terminal in connected state that joined the multicast session is in the cell;

multicasting the data for the multicast session in the cell if second terminal in connected state that joined the multicast session is in the cell.

15. The third apparatus according to any of the above, wherein the instructions, when executed by the one or more processors, cause the apparatus to perform:

inhibiting the multicasting the data for the multicast session in the cell if the cell does not receive the indication and none of the at least one second terminal in the connected state that joined the multicast session is in the cell.

16. The third apparatus according to any of the above, wherein the instructions, when executed by the one or more processors, cause the apparatus to perform:

requesting the establishment of shared data delivery for the multicast session when starting to multicast the data for the multicast session.

17. A fourth apparatus comprising:

one or more processors, and memory storing instructions that, when executed by the one or more processors, cause the apparatus to perform:

monitoring whether a terminal receives, from a cell, an advertisement indicating that data for a multicast session are transmitted in a transmission mode for inactive reception, wherein the data transmitted in the transmission mode for inactive reception are suitable to be received by the terminal in an inactive state;

checking whether the terminal is in the inactive state and wants to receive the data for the multicast session;

providing an indication to the cell that the terminal is in the inactive state and wants to receive the data for the multicast session if the terminal receives the advertisement, is in the inactive state, and wants to receive the data for the multicast session.

18. The fourth apparatus according to any of the above, wherein the indication comprises at least one of an interest indication and a preamble.

19. The fourth apparatus according to any of the above, wherein the instructions, when executed by the one or more processors, cause the apparatus to perform:

providing a request to transition to a connected state if the terminal does not receive the advertisement during a predetermined time period, is in the inactive state, and wants to receive the data for the multicast session.

The invention claimed is:

1. An apparatus comprising:

one or more processors, and memory storing instructions that, when executed by the one or more processors, cause the apparatus to perform:

receiving a request, wherein the request requests a radio access network (RAN) node to broadcast an advertisement of a multicast session, wherein the advertisement indicates that the apparatus transmits data for the multicast session in a transmission mode for inactive reception, and wherein the data transmitted in the transmission mode for inactive reception is suitable to be received by a first terminal in an inactive state, wherein the request comprises:

an identifier of the multicast session, assistance information indicating whether or not applying the transmission mode for inactive reception for transmitting the data for the multicast session is preferred, an indication of a service area of the multicast session;

determining one or more cells associated with the apparatus based on the service area received in the request;

determining, for each cell of the one or more cells, whether or not the RAN node transmits the data for the multicast session in the transmission mode for reception in inactive state or in a transmission mode for reception in connected state based on the following:

whether or not the RAN node receives the request to broadcast the advertisement;

a number of terminals wanting to receive the multicast session in the cell;

a radio resource control (RRC) state of terminals in the multicast session in the cell;

a load in the cell;

capabilities of terminals that have joined the multicast session in the cell to receive data for the multicast session while in inactive state; and assistance information received as part of the request to broadcast;

determining the apparatus is configured to transmit the data for the multicast session in the transmission mode for inactive reception;

broadcasting the advertisement periodically in the one or more cells based on the receiving the request and the determining that the apparatus is configured to transmit the data for the multicast session in the transmission mode for inactive reception, wherein broadcasting the advertisement includes an indication of the determined transmission mode;

supervising, for each of the one or more cells, whether the RAN node receives an indication that the first terminal desires to receive the data for the multicast session, wherein the indication that the first terminal desires to receive the data for the multicast session comprises:

an interest indication, and a preamble transmitted while the first terminal is in the inactive state;

multicasting the data for the multicast session in the cell in the transmission mode for reception in inactive state if the cell receives the indication that the first terminal desires to receive the data for the multicast session;

supervising for each of the one or more cells whether at least one second terminal in connected state that joined the multicast session is in the cell;

multicasting the data for the multicast session in the cell if second terminal in connected state that joined the multicast session is in the cell;

inhibiting the multicasting the data for the multicast session in the cell if the cell does not receive the indication and none of the at least one second terminal in the connected state that joined the multicast session is in the cell; and requesting the establishment of shared data delivery for the multicast session when starting to multicast the data for the multicast session.

* * * * *